(12) United States Patent
Tateishi et al.

(10) Patent No.: US 11,637,718 B2
(45) Date of Patent: Apr. 25, 2023

(54) RECEIVING DEVICE, MONITOR AND COMPUTER PROGRAM

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Hiroshi Tateishi, Mie (JP); Hiroshi Ueda, Mie (JP); Ryo Tanaka, Mie (JP); Tetsuya Noda, Mie (JP); Shogo Kamiguchi, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 677 days.

(21) Appl. No.: 16/629,401

(22) PCT Filed: Jun. 28, 2018

(86) PCT No.: PCT/JP2018/024481
§ 371 (c)(1),
(2) Date: Jan. 8, 2020

(87) PCT Pub. No.: WO2019/017174
PCT Pub. Date: Jan. 24, 2019

(65) Prior Publication Data
US 2020/0145249 A1    May 7, 2020

(30) Foreign Application Priority Data
Jul. 19, 2017 (JP) .............................. JP2017-140247

(51) Int. Cl.
*H04L 29/06*    (2006.01)
*H04L 12/40*    (2006.01)
(Continued)

(52) U.S. Cl.
CPC .......... *H04L 12/40* (2013.01); *G06F 11/3003* (2013.01); *H04L 63/1416* (2013.01);
(Continued)

(58) Field of Classification Search
CPC ................ H04L 12/40; H04L 63/1416; H04L 63/1425; G06F 11/3003
See application file for complete search history.

(56) References Cited

U.S. PATENT DOCUMENTS

| 9,705,678 | B1* | 7/2017 | Wang .................... G06F 21/602 |
| 2007/0153689 | A1 | 7/2007 | Strub et al. |
| 2015/0066239 | A1* | 3/2015 | Mabuchi ............... H04L 12/403 |
| | | | 701/1 |

FOREIGN PATENT DOCUMENTS

| JP | 2002-152204 A | 5/2002 |
| JP | 2004-320636 A | 11/2004 |

OTHER PUBLICATIONS

International Search Report, Application No. PCT/JP2018/024481, dated Aug. 21, 2019. ISA/Japan Patent Office.

* cited by examiner

*Primary Examiner* — Jeffrey C Pwu
*Assistant Examiner* — Thong P Truong
(74) *Attorney, Agent, or Firm* — Honigman LLP

(57) ABSTRACT

In a relay device, a transmitting/receiving unit of an ECU relay receives data. A first counter value is incremented if an amount of data received by the transmitting/receiving unit per unit time exceeds a first threshold. A second counter value is incremented if the amount of data received by the transmitting/receiving unit per unit time exceeds a second threshold. The second threshold is greater than the first threshold. A control unit of a bus relay repeatedly monitors the first counter value. If the first counter value is incre- (Continued)

mented, the control unit shortens a cycle with which the second counter value is monitored.

9 Claims, 8 Drawing Sheets

(51) Int. Cl.
    *G06F 11/30*     (2006.01)
    *H04L 9/40*     (2022.01)

(52) U.S. Cl.
    CPC ...... *H04L 63/1425* (2013.01); *G06F 2201/88* (2013.01); *H04L 2012/40215* (2013.01); *H04L 2012/40273* (2013.01)

FIG. 3

Setting Information

| | Relay setting |
|---|---|
| Transmitting/receiving unit 60a | prohibited |
| Transmitting/receiving unit 60b | permitted |
| Transmitting/receiving unit 60c | permitted |

FIG. 4

Counter Value Information

| | A | B | C |
|---|---|---|---|
| Green value | 10 | 11 | 11 |
| Yellow value | 3 | 5 | 5 |
| Red value | 0 | 1 | 1 |

Legend
A= Transmitting/receiving unit 60a
B= Transmitting/receiving unit 60b
C= Transmitting/receiving unit 60c

FIG. 5

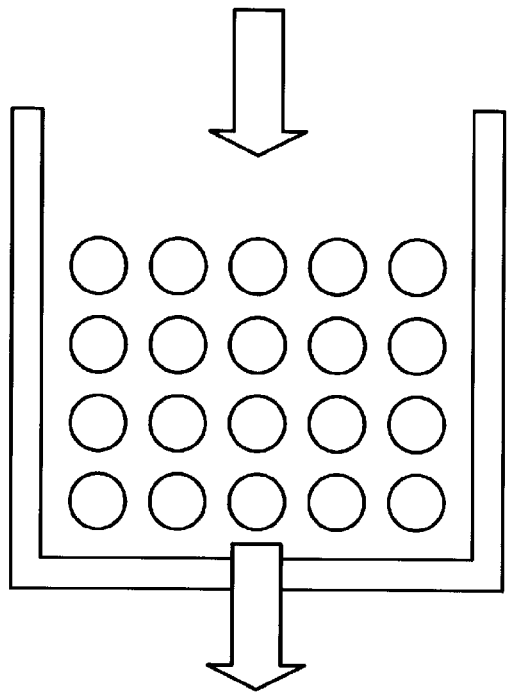

Execute increment operation each time predetermined time period elapses.

In receiving operation executed each time data is received, decrement first token value and second token value

FIG. 6

Increment operation

If "first token value + first reference value ≤ upper limit" is met,

⇒ First token value: incremented by first reference value

If "first token value + first reference value > upper limit" is met

⇒ First token value: adjusted to upper limit

FIG. 7

Receiving operation executed when relay setting is set to "permitted"

If "first token value ≥ received byte count", and "second token value ≥ received byte count" are met ⇒ First token value: decremented by received byte count
Second token value: decremented by received byte count
Green value: incremented by 1
Received data: to be relayed If "first token value < received byte count", and "second token value ≥ received byte count" are met ⇒ First token value: unchanged
Second token value: decremented by received byte count
Yellow value: incremented by 1
Received data: to be relayed If "first token value < received byte count", and "second token value < received byte count" are met ⇒ First token value: unchanged
Second token value: unchanged
Red value: incremented by 1
Received data: to be discarded Receiving operation executed when relay setting is set to "prohibited"

Adjustment of first token value and second token value: same
Adjustment of green value, yellow value, and red value: same
Received data: to be discarded or output regardless of first token value and second token value Legend
A= Monitoring enhanced state
B= Relay prohibited state

RECEIVING DEVICE, MONITOR AND COMPUTER PROGRAM

CROSS-REFERENCE TO RELATED APPLICATIONS

This application is the U.S. national stage of PCT/JP2018/024481 filed on Jun. 28, 2018, which claims priority of Japanese Patent Application No. JP 2017-140247 filed on Jul. 19, 2017, the contents of which are incorporated herein.

TECHNICAL FIELD

The present disclosure relates to a receiving device that receives data, and a monitor and a computer program that monitor a data receiving state.

BACKGROUND

In vehicles, a plurality of electronic control units (ECUs) are installed that respectively control operation of a plurality of pieces of electrical equipment. Also, a communication system in which a plurality of ECUs communicate with each other is installed in many vehicles. As the communication system in which a plurality of ECUs communicate with each other, a communication system is conceivable that includes a receiving device that receives data from one of the ECUs, and transmits the data received by the receiving device to another ECU.

If, for example, a control program of an ECU that transmits data to the receiving device is tampered with or hacked, and the ECU is caused to continuously transmit unwanted data to the receiving device at short time intervals, then this may impair the function of the receiving device. If the receiving device continuously receives data at short time intervals, and executes normal processing on the received data, the receiving device will consistently process the data received from the ECU whose control program is tampered with. As a result, the receiving device can hardly process data received from ECUs other than this ECU, and the function of the receiving device is impaired. An attack in which unwanted data is continuously transmitted to a receiving device at short time intervals is called a "denial of service (DoS) attack".

JP 2004-320636A discloses a configuration that detects a DoS attack. This configuration starts counting the number of receiving times that data has been received, each time a predetermined time period elapses. A DoS attack is detected if the counted number of receiving times in a predetermined time period exceeds a threshold.

A conventional receiving device is a receiving device including a receiver that receives data. The receiver stores a variable value, and periodically increments the variable value by a predetermined value. Also, the receiver decrements the variable value each time it receives data. An amount by which the variable value is decremented is, for example, the byte count of the received data. If, for example, the byte count of the received data is 500 bytes, the variable value is decremented by 500.

If, when data is received, the variable value before the decrement is less than the byte count of the received data, the receiver discards the received data, and increments a counter value by 1. Here, the variable value is not changed but is kept as is. The receiving device further includes, for example, a microcomputer, and the microcomputer periodically monitors the counter value of the receiver and determines whether or not the counter value has been incremented from the previous counter value. If it is determined by the microcomputer that the counter value has been incremented, a DoS attack is detected. Upon detection of a DoS attack, the microcomputer changes, for example, settings of the receiver, and causes the receiver to discard data received from those ECUs whose control program is tampered with, regardless of the counter value.

Even after having discarded received data, the receiver periodically increments the variable value by the predetermined value. Accordingly, when a certain time period elapses and another piece of data is received after discarding the received data, the variable value before the decrement may be greater than the byte count of the received piece of data. Thus, if the variable value before the decrement is greater than the byte count of received data, the receiver may process data relating to a DoS attack, and the data may be transmitted to an ECU.

As a result, unless settings of the receiver are changed after the received data was discarded, the receiver will process data relating to a DoS attack, and the data will be transmitted to an ECU. It is not preferable that data relating to a DoS attack is transmitted to an ECU, because the ECU that receives this data may execute unintended processing. Accordingly, in order to suppress the number of times that data relating to a DoS attack is transmitted, the microcomputer needs to detect the DoS attack as promptly as possible.

As a configuration for promptly detecting a DoS attack, a configuration is conceivable in which a monitoring cycle with which the microcomputer monitors the counter value is set to a short cycle. However, in this configuration, the processing load of the microcomputer to monitor the counter value, that is, a DoS attack, is high. Microcomputers typically execute a variety of processing. Therefore, if the microcomputer needs a high processing load to monitor a DoS attack, this will cause the problem that the microcomputer cannot effectively execute another type of processing.

The present disclosure was made in view of the aforementioned circumstances, and it is an object thereof to provide a receiving device, a monitor, and a computer program that enable prompt detection of an attack in which unwanted data is continuously transmitted at short time intervals, and need a low processing load to monitor the attack.

Solution to Problem

According to the present disclosure, a receiving device includes: a receiver with a receiving unit configured to receive data; and a monitor configured to monitor a state in which the receiving unit receives data, the receiver including: a first adjustment unit configured to periodically increment a first variable value by a first predetermined value, and decrement, each time data is received by the receiving unit, the first variable value by a data value that corresponds to an amount of the data received by the receiving unit; a first counter configured to increment, upon data being received by the receiving unit, a first counter value if the first variable value before being decremented by the first adjustment unit is less than the data value; a second adjustment unit configured to periodically increment a second variable value by a second predetermined value, which is greater than the first predetermined value, and decrement, each time data is received by the receiving unit, the second variable value by the data value; and a second counter configured to increment, upon data being received by the receiving unit, a second counter value if the second variable value before being decremented by the second adjustment unit is less than the data value, and the monitor including: a first determination unit configured to repeatedly monitor the first counter value, and determine whether or not the first counter value has been incremented; a second determination unit configured to periodically monitor the second counter value, and determine whether or not the second counter value has been incremented; and a shortening unit configured to shorten a monitoring cycle with which the second determination unit monitors the second counter value, if it is determined by the first determination unit that the first counter value has been incremented.

According to the present disclosure, the second predetermined value is greater than the first predetermined value. Therefore, the first counter value is more likely to be incremented, but the second counter value is less likely to be incremented. If it is determined that the second counter value has been incremented, an attack in which unwanted data is continuously transmitted at short time intervals is detected. If it is determined that the first counter value has not been incremented, then there is considered to be a low likelihood that the above-described attack is occurring, and thus the monitoring cycle with which the second counter value is monitored is long. If it is determined that the first counter value has been incremented, then there is considered to be a high likelihood that the above-described attack is occurring, and thus the monitoring cycle with which the second counter value is monitored is short.

Since, if it is determined that the first counter value has been incremented, the monitoring cycle is shortened, the above-described attack is promptly detected. Furthermore, since the monitoring cycle is long until it is determined that the first counter value has been incremented, the processing load to monitor the above-described attack, that is, the second counter value is low.

In the receiving device according to the present disclosure, the shortening unit of the monitor may be configured to shorten the monitoring cycle from a predetermined first cycle to a predetermined second cycle, which is shorter than the first cycle, if it is determined by the first determination unit that the first counter value has been incremented, and if, while the monitoring cycle is set to the second cycle, it is determined by the first determination unit that the first counter value has not been incremented, the shortening unit may be configured to return the monitoring cycle to the first cycle.

According to the present disclosure, the second cycle is shorter than the first cycle. If it is determined that the first counter value has been incremented, the monitor shortens the monitoring cycle from the first cycle to the second cycle. If, while the second counter value is monitored with the second cycle, it is determined that first counter value has not been incremented, then there is considered to be a low likelihood that the above-described attack is occurring, and thus the monitor returns the monitoring cycle to the first cycle. Accordingly, the processing load to monitor the above-described attack is further reduced.

In the receiving device according to the present disclosure, the second determination unit of the monitor may be configured to determine, with the monitoring cycle, whether or not the second counter value has been incremented, even after having determined that the second counter value was incremented, the shortening unit of the monitor may be configured to shorten the monitoring cycle from a predetermined first cycle to a predetermined second cycle, which is shorter than the first cycle, if it is determined by the first determination unit that the first counter value has been incremented, and the shortening unit may be configured to adjust the monitoring cycle to the second cycle after it is determined by the second determination unit that the second counter value has been incremented.

According to the present disclosure, the second cycle is shorter than the first cycle. If it is determined that the first counter value has been incremented, the monitor shortens the monitoring cycle from the first cycle to the second cycle. Even after having determined that the second counter value was incremented and having detected the above-described attack, the monitor monitors the second counter value with the second cycle, and determines whether or not the second counter value has been incremented from the previously monitored value. If it is determined that the second counter value has not been incremented from the previously monitored value, the monitor regards the above-described attack as being stopped, for example.

If it is determined by the monitor that the second counter value has been incremented, processing of data received by the receiver is stopped, for example. Then, if it is determined by the monitor that the second counter value has been incremented from the previously monitored value, the processing of the data received by the receiver is restarted. Since, after the detection of the above-described attack, the cycle with which the monitor monitors the second counter value is the second cycle, it is possible to promptly restart the processing of the data received by the receiver upon the above-described attack being stopped.

In the receiving device according to the present disclosure, the second determination unit of the monitor may be configured to determine, with the monitoring cycle, whether or not the second counter value has been incremented, even after having determined that the second counter value was incremented, the shortening unit of the monitor may be configured to shorten the monitoring cycle from a predetermined first cycle to a predetermined second cycle, which is shorter than the first cycle, if it is determined by the first determination unit that the first counter value has been incremented, and the shortening unit may be configured to adjust the monitoring cycle to the first cycle after it is determined by the second determination unit that the second counter value has been incremented.

According to the present disclosure, the second cycle is shorter than the first cycle. If it is determined that the first counter value has been incremented, the monitor shortens the monitoring cycle from the first cycle to the second cycle. Even after having determined that the second counter value was incremented and having detected the above-described attack, the monitor monitors the second counter value, and determines whether or not the second counter value has been incremented from the previous second counter value. If it is determined that the second counter value has not been incremented from the previous second counter value, the monitor regards the above-described attack as being stopped, for example. After the above-described attack is detected by the monitor, the monitoring cycle with which the second counter value is monitored is the first cycle. Accordingly, after the above-described attack was detected by the monitor, the processing load to perform monitoring is low.

In the receiving device according to the present disclosure, the monitor may include a transmission unit configured to transmit data received by the receiving unit of the receiver, and the transmission unit may be configured to stop transmitting the data received by the receiving unit, if it is determined by the second determination unit that the second counter value has been incremented.

According to the present disclosure, the monitor transmits data received from an external device by the receiver to another external device. If it is determined that the second counter value has been incremented, the monitor stops transmitting the data received by the receiver. Accordingly, the number of times that data relating to an above-described attack is transmitted is suppressed.

In the receiving device according to the present disclosure, the transmission unit may be configured to restart the transmission, if, while the transmission is stopped, it is determined by the second determination unit that the second counter value has not been incremented.

According to the present disclosure, after it is determined that the second counter value has been incremented and transmission of data received by the receiver is stopped, the monitor determines whether or not the second counter value has been incremented from the previous second counter value. After the transmission was stopped, if it is determined that the second counter value has not been incremented from the previous second counter value, the monitor restarts the transmission.

In the receiving device according to the present disclosure, the monitor may include a saving unit configured to save, each time N (where N is an integer of 2 or more) pieces of data received by the receiving unit are received after it is determined by the second determination unit that the second counter value has been incremented, one of the N pieces of data received by the receiving unit.

According to the present disclosure, each time N pieces of data received by the receiver are received after it is determined that the second counter value has been incremented, the monitor saves one of the N pieces of data to, for example, analyze the above-described attack.

According to the present disclosure, a monitor is configured to periodically monitor a state in which data is received, and includes: a first determination unit configured to repeatedly monitor a first counter value, which is incremented if an amount of data received per unit time exceeds a first threshold, and determine whether or not the first counter value has been incremented; a second determination unit configured to periodically monitor a second counter value, which is incremented if an amount of data received per unit time exceeds a second threshold, and determine whether or not the second counter value has been incremented, the second threshold being greater than the first threshold; and a shortening unit configured to shorten a monitoring cycle with which the second determination unit monitors the second counter value, if it is determined by the first determination unit that the first counter value has been incremented.

According to the present disclosure, a computer program causes a computer to execute processing of repeatedly acquiring a first counter value, which is incremented if an amount of data received per unit time exceeds a first threshold; determining whether or not the first counter value has been incremented; periodically acquiring a second counter value, which is incremented if an amount of data received per unit time exceeds a second threshold, the second threshold being greater than the first threshold; and shortening a cycle with which the second counter value is acquired, if it is determined that the first counter value has been incremented.

In the monitor and the computer program according to the present disclosure, if it is determined that the first counter value has not been incremented, then there is considered to be a low likelihood that an attack in which unwanted data is continuously transmitted at short time intervals is occurring, and thus the monitoring cycle with which the second counter value is acquired and monitored is long. Accordingly, the processing load to monitor the above-described attack, that is, the second counter value is low. Furthermore, if it is determined that the first counter value has been incremented, then there is considered to be a high likelihood that the above-described attack is occurring, and thus the monitoring cycle with which the second counter value is acquired and monitored is short. Accordingly, the above-described attack is promptly detected.

Advantageous Effects of Disclosure

According to the present disclosure, it is possible to enable prompt detection of an attack in which unwanted data is continuously transmitted at short time intervals, and realize a low processing load to monitor the attack.

BRIEF DESCRIPTION OF DRAWINGS

FIG. 3 is a table illustrating the content of setting information.

FIG. 4 is a table illustrating the content of counter value information.

FIG. 5 illustrates increment and decrement of a first token value and a second token value.

FIG. 6 illustrates increment operation.

FIG. 7 illustrates receiving operation.

DETAILED DESCRIPTION OF PREFERRED EMBODIMENTS

Hereinafter, the present disclosure will be described in detail with reference to the drawings illustrating embodiments thereof.

Embodiment 1

Figure 1:
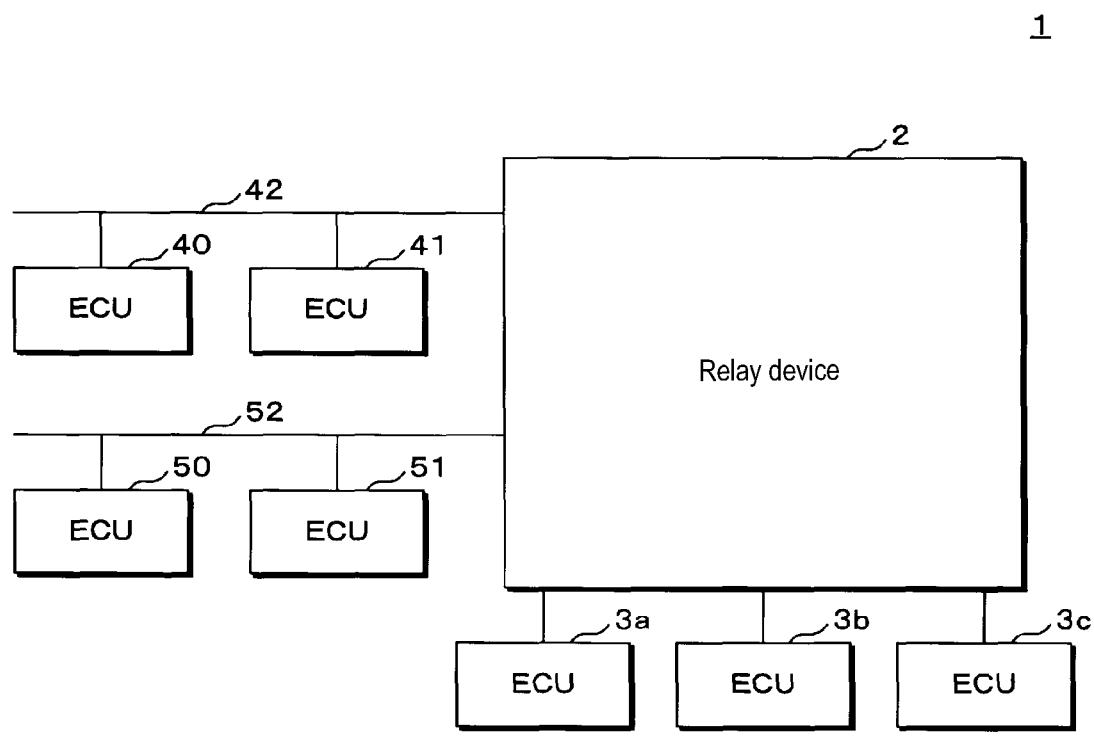
FIG. 1 is a block diagram illustrating a configuration of a main part of a communication system according to Embodiment 1.

FIG. 1 is a block diagram illustrating a configuration of a main part of a communication system 1 according to Embodiment 1. The communication system 1 is suitably installed in a vehicle, and includes a relay device 2, and ECUs 3*a*, 3*b*, 3*c*, 40, 41, 50, and 51. Three ECUs 3*a*, 3*b*, and 3*c* are individually connected to the relay device 2. Furthermore, two communication buses 42 and 52 are individually connected to the relay device 2. Two ECUs 40 and 41, in addition to the relay device 2, are individually connected to the communication bus 42. Two ECUs 50 and 51, in addition to the relay device 2, are individually connected to the communication bus 52.

The ECUs 3*a*, 3*b*, 3*c*, 40, 41, 50, and 51 are respectively connected to not-shown pieces of electrical equipment, and control operations of the respective pieces of electrical equipment connected thereto. Furthermore, the ECUs 3*a*, 3*b*, 3*c*, 40, 41, 50, and 51 function as a communication device, and communicate with each other. For example, the ECU 3*a* transmits, to the ECU 40, data indicating an instruction accepted from a user by the piece of electrical equipment connected to the ECU 3*a*. The ECU 40 controls, based on the data received from the ECU 3a, an operation of the piece of electrical equipment connected to the ECU 40.

Three ECUs 3a, 3b, and 3c communicate with each other via the relay device 2. The communication between the relay device 2 and each of the ECUs 3a, 3b, and 3c complies with a first protocol. The first protocol is, for example, an Ethernet (registered trademark) communication protocol.

The ECUs 40 and 41 communicate with each other via the communication bus 42. The ECUs 40 and 41 further communicate with the ECUs 50 and 51 via the relay device 2. Similarly, the ECUs 50 and 51 communicate with each other via the communication bus 52. The ECUs 50 and 51 further communicate with the ECUs 40 and 41 via the relay device 2.

The relay device 2 communicates with the ECUs 40 and 41 via the communication bus 42, and communicates with the ECUs 50 and 51 via the communication bus 52. The communication via the communication buses 42 and 52 complies with a second protocol. The second protocol is the CAN (Controller Area Network) protocol, the CAN-FD (Controller Area Network with Flexible Data rate) protocol, or the like, and is different from the first protocol.

Data transmitted by one of the relay device 2 and the ECUs 40 and 41 via the communication bus 42 is received by all the remaining components of the relay device 2 and the ECUs 40 and 41 other than that component that has transmitted the data. Similarly, data transmitted by one of the relay device 2 and the ECUs 50 and 51 via the communication bus 52 is received by all the remaining components of the relay device 2 and the ECUs 50 and 51 other than that component that has transmitted the data.

The ECUs 3a, 3b, and 3c each communicate with the ECUs 40, 41, 50, and 51 via the relay device 2.

The relay device 2 relays data transmitted by the ECUs 3a, 3b, 3c, 40, 41, 50, and 51.

Figure 2:
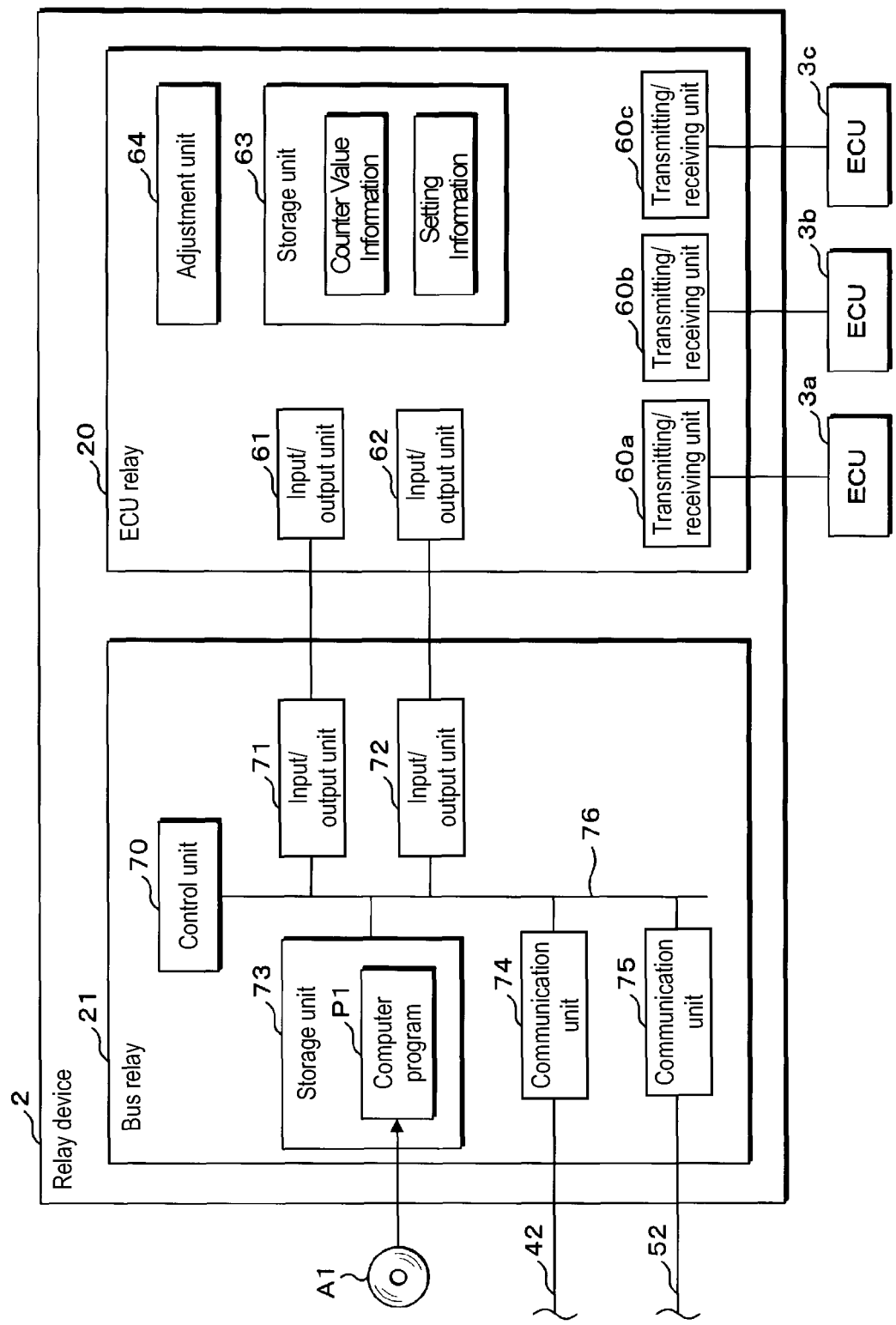
FIG. 2 is a block diagram illustrating a configuration of a main part of a relay device.

FIG. 2 is a block diagram illustrating a configuration of a main part of the relay device 2. The relay device 2 includes an ECU relay 20 and a bus relay 21. The ECU relay 20 is connected to the bus relay 21, and the ECUs 3a, 3b, and 3c. The bus relay 21 is further connected to the communication buses 42 and 52.

The ECU relay 20 receives data from each of the ECUs 3a, 3b, and 3c. Data that is transmitted by the ECUs 3a, 3b, and 3c contains destination information that indicates a destination. In the ECU relay 20, relay settings relating to relay of data that is received from the respective ECUs 3a, 3b, and 3c are set to "permitted" or "prohibited". The relay settings are changed individually by the bus relay 21.

If data is received from one of the ECUs 3a, 3b, and 3c, and the relay setting of the received data is set to "prohibited", the ECU relay 20 discards the received data, or outputs the received data to the bus relay 21 as save data, which is to be saved. Upon input of the save data from the ECU relay 20, the bus relay 21 saves the input save data.

If data is received from one of the ECUs 3a, 3b, and 3c, and the relay setting of the received data is set to "permitted", the ECU relay 20 relays the received data. If the destination indicated by the destination information contained in the received data is one of the ECUs 3a, 3b, and 3c, the ECU relay 20 transmits the received data to the destination indicated by the destination information.

Let's assume that the ECU relay 20 receives, from one of the ECUs 3a, 3b, and 3c, data whose relay setting is set to "permitted", and the destination indicated by the destination information contained in the received data is one of the ECUs 40, 41, 50, and 51. In this case, the ECU relay 20 outputs, to the bus relay 21, the received data as transmission data that is to be transmitted to the one of the ECUs 40, 41, 50, and 51.

Upon input of the transmission data from the ECU relay 20, the bus relay 21 determines, based on the destination information contained in the input transmission data, one of the communication buses 42 and 52 as a medium via which the transmission data is to be transmitted, and converts the format of the input transmission data from a first protocol format to a second protocol format. The bus relay 21 transmits the transmission data in the converted format via the determined medium.

For example, if the ECU relay 20 receives, from the ECU 3a, data that contains destination information indicating the ECU 40 as a destination and whose relay setting is set to "permitted", the ECU relay 20 outputs the received data to the bus relay 21 as transmission data. The bus relay 21 determines, based on the destination information contained in the transmission data input from the ECU relay 20, the communication bus 42 as a medium via which the transmission data is to be transmitted, and converts the format of the transmission data from the first protocol format to the second protocol format. The bus relay 21 transmits the transmission data in the converted format to the ECU 40 via the communication bus 42.

The bus relay 21 receives data via the communication buses 42 and 52. Data that is transmitted via the communication buses 42 and 52 contains identification information for identifying the data. Upon receiving data via the communication bus 42 or 52, the bus relay 21 determines, based on the identification information contained in the received data, whether or not to discard the received data. If it is determined that the received data is to be discarded, the bus relay 21 discards the received data.

If it is determined that the received data is not to be discarded, the bus relay 21 determines the destination of the received data based on the identification information contained in the received data. If the determined destination is one of the ECUs 40, 41, 50, and 51, the bus relay 21 transmits the received data to the determined destination via the communication bus 42 or 52. If the determined destination is one of the ECUs 3a, 3b, and 3c, the bus relay 21 converts the format of the received data from the second protocol format to the first protocol format, and outputs the data in the converted format to the ECU relay 20. The data in the converted format contains destination information that indicates the destination determined by the bus relay 21.

Upon input of the data from the bus relay 21, the ECU relay 20 transmits the input data to the destination indicated by the destination information contained in the input data.

The ECU relay 20 includes transmitting/receiving units 60a, 60b, and 60c, input/output units 61 and 62, a storage unit 63, and an adjustment unit 64. The transmitting/receiving units 60a, 60b, and 60c are respectively connected to the ECUs 3a, 3b, and 3c. The input/output units 61 and 62 are individually connected to the bus relay 21.

The transmitting/receiving units 60a, 60b, and 60c respectively transmit data to the ECUs 3a, 3b, and 3c, and receive data from the ECUs 3a, 3b, and 3c. The transmitting/receiving units 60a, 60b, and 60c each function as a receiving unit, and the ECU relay 20 functions as a receiver.

The input/output unit 61 outputs transmission data and save data to the bus relay 21. The bus relay 21 outputs data to the input/output unit 61 of the ECU relay 20.

From the bus relay 21, an instruction signal for instructing a change of stored content stored in the storage unit 63 of the ECU relay 20, and a request signal for requesting output of a signal representing the stored content are input to the input/output unit 62 of the ECU relay 20. Upon input of the request signal, the input/output unit 62 outputs, to the bus relay 21, a signal representing the stored content stored in the storage unit 63.

In the storage unit 63, setting information is stored that indicates relay settings of data that is received from the respective transmitting/receiving units 60a, 60b, and 60c. FIG. 3 is a table showing the content of the setting information. In the setting information, the relay settings of data that is received from the transmitting/receiving units 60a, 60b, and 60c are set to "permitted" or "prohibited" for relay. In the setting information shown in FIG. 3, relay of data received by the transmitting/receiving unit 60a is prohibited, and relay of data received by the transmitting/receiving units 60b and 60c is permitted.

The bus relay 21 outputs, to the input/output unit 62, an instruction signal for instructing a change of the corresponding relay setting of data that is received by any of the transmitting/receiving units 60a, 60b, and 60c. In accordance with the instruction signal input to the input/output unit 62, the relay setting of data that is received by the corresponding one of the transmitting/receiving units 60a, 60b, and 60c is changed. For example, if an instruction signal for instructing a change of the relay setting of data that is received by the transmitting/receiving unit 60a to "permitted" is input to the input/output unit 62, in the setting information, the relay setting of data received by the transmitting/receiving unit 60a is changed to "permitted".

The receiving operation that is performed by the ECU relay 20 each time data is received by one of the transmitting/receiving units 60a, 60b, and 60c depends on the relay setting indicated by the setting information stored in the storage unit 63.

In the storage unit 63, counter value information is stored that indicates, for each of the transmitting/receiving units 60a, 60b, and 60c, three counter values for detecting an attack, a so-called DoS attack, in which unwanted data is continuously transmitted at short time intervals. A green value, a yellow value, and a red value are set as the three counter values.

FIG. 4 is a table showing the content of the counter value information. As shown in FIG. 4, a green value, a yellow value, and a red value are stored for data received by each of the transmitting/receiving units 60a, 60b, and 60c. These values are changed individually by the adjustment unit 64.

The bus relay 21 outputs, to the input/output unit 62 of the ECU relay 20, a request signal for requesting output of a counter value signal representing the counter value information stored in the storage unit 63. Upon input of the request signal, the input/output unit 62 of the ECU relay 20 outputs, to the bus relay 21, a counter value signal representing the counter value information.

In the storage unit 63, a first token value and a second token value are stored for data received by the transmitting/receiving units 60a, 60b, and 60c. The adjustment unit 64 adjusts the first token value and the second token value for data received by the transmitting/receiving units 60a, 60b, and 60c.

FIG. 5 illustrates increment and decrement of a first token value and a second token value. In the following, the first token value and the second token value for data received by the transmitting/receiving unit 60a are taken for description. An upper limit and a lower limit are preset for each of the first token value and the second token value. The upper limits for the first token value and the second token value are the same or substantially the same. The lower limits for the first token value and the second token value are zero.

The adjustment unit 64 executes an increment operation of incrementing the first token value and the second token value each time a predetermined time period elapses. Also, the adjustment unit 64 executes a receiving operation each time the transmitting/receiving unit 60a receives data, and decrements the first token value and the second token value in the receiving operation.

FIG. 6 illustrates an increment operation. In the storage unit 63, a first reference value is stored. The first reference value is a preset natural number and is constant. If, at a point in time when a predetermined time period has elapsed, the sum of the first token value and the first reference value is less than or equal to the upper limit of the first token value, the adjustment unit 64 increments the first token value by the first reference value.

The adjustment unit 64 periodically increments the first token value by the first reference value as long as the sum of the first token value and the first reference value is less than or equal to the upper limit of the first token value. The first token value and the first reference value correspond to a first variable value and a first predetermined value, respectively.

Also, if, at a point in time when the predetermined time period has elapsed, the sum of the first token value and the first reference value exceeds the upper limit of the first token value, the adjustment unit 64 adjusts the first token value to the upper limit of the first token value.

The adjustment unit 64 also increments the second token value, in the same manner as in the first token value, each time a predetermined time period elapses. In the storage unit 63, a second reference value is stored. Similar to the first reference value, the second reference value is a preset natural number and is constant. Note, however, that the second reference value is greater than the first reference value. The first reference value is, for example, 1000, and the second reference value is, for example, 1500.

If, at a point in time when the predetermined time period has elapsed, the sum of the second token value and the second reference value is less than or equal to the upper limit of the second token value, the adjustment unit 64 increments the second token value by the second reference value.

The adjustment unit 64 periodically increments the second token value by the second reference value as long as the sum of the second token value and the second reference value is less than or equal to the upper limit of the second token value. The second token value and the second reference value correspond to a second variable value and a second predetermined value, respectively.

Also, if, at a point in time when the predetermined time period has elapsed, the sum of the second token value and the second reference value exceeds the upper limit of the second token value, the adjustment unit 64 adjusts the second token value to the upper limit of the second token value.

FIG. 7 illustrates a receiving operation. As described above, the ECU relay 20 executes a receiving operation each time the transmitting/receiving unit 60a receives data from the ECU 3a. The receiving operation depends on the relay setting indicated by the setting information stored in the storage unit 63. Hereinafter, the byte count of data received by the transmitting/receiving unit 60a is referred to as "received byte count". The received byte count is an amount of data received by the transmitting/receiving unit 60a, and is a value that corresponds to the amount of data. The received byte count corresponds to a data value.

If the transmitting/receiving unit 60a receives 500 bytes of data, the received byte count is 500.

In a receiving operation executed when the relay setting of data received by the transmitting/receiving unit 60a is set to "permitted", if both the first token value and the second token value are greater than or equal to a received byte count, the adjustment unit 64 decrements the first token value and the second token value by the received byte count. Also, the adjustment unit 64 increments, in the counter value information stored in the storage unit 63, the green value with respect to the data received by the transmitting/receiving unit 60a, by 1. Furthermore, the ECU relay 20 relays the data received by the transmitting/receiving unit 60a.

In the receiving operation executed when the relay setting of data received by the transmitting/receiving unit 60a is set to "permitted", if the first token value is less than the received byte count and the second token value is greater than or equal to the received byte count, the adjustment unit 64 does not change the first token value but decrements the second token value by the received byte count. Also, the adjustment unit 64 increments, in the counter value information stored in the storage unit 63, the yellow value with respect to the data received by the transmitting/receiving unit 60a, by 1. Furthermore, the ECU relay 20 relays the data received by the transmitting/receiving unit 60a.

In the receiving operation executed when the relay setting of data received by the transmitting/receiving unit 60a is set to "permitted", if both the first token value and the second token value are less than the received byte count, the adjustment unit 64 does not change the first token value and the second token value. Also, the adjustment unit 64 increments, in the counter value information stored in the storage unit 63, the red value with respect to the data received by the transmitting/receiving unit 60a, by 1. Furthermore, the ECU relay 20 discards the data received by the transmitting/receiving unit 60a.

In a receiving operation executed when the relay setting of data received by the transmitting/receiving unit 60a is set to "prohibited", the adjustment unit 64 executes the same adjustment of the first token value and the second token value as the adjustment of the first token value and the second token value that is executed by the adjustment unit 64 in the receiving operation executed when the relay setting of data received by the transmitting/receiving unit 60a is set to "permitted".

Also, in the receiving operation executed when the relay setting of data received by the transmitting/receiving unit 60a is set to "prohibited", the adjustment unit 64 executes the same adjustment of the green value, the yellow value, and the red value as the adjustment of the green value, the yellow value, and the red value that is executed by the adjustment unit 64 in the receiving operation executed when the relay setting of data received by the transmitting/receiving unit 60a is set to "permitted".

Accordingly, each time the transmitting/receiving unit 60a receives data, the adjustment unit 64 decrements the first token value by the corresponding received byte count, as long as the first token value before the decrement is greater than or equal to the received byte count. The adjustment unit 64 functions as a first adjustment unit.

Furthermore, when data is received by the transmitting/receiving unit 60a, if the first token value before the decrement is less than the corresponding received byte count, the adjustment unit 64 decrements the yellow value by 1. Accordingly, the adjustment unit 64 also functions as a first counter, and the yellow value serves as a first counter value.

If the received byte count of data received per unit time exceeds the amount by which the first token value is incremented per unit time, the first token value before the decrement will be less than the first reference value, and the yellow value will be incremented. The amount by which the first token value is incremented per unit time is a value obtained by dividing the first reference value by a cycle length. Accordingly, the yellow value will be incremented if an amount of data received by the transmitting/receiving unit 60a per unit time exceeds a predetermined first threshold.

Similarly, each time the transmitting/receiving unit 60a receives data, the adjustment unit 64 decrements the second token value by the corresponding received byte count, as long as the second token value before the decrement is greater than or equal to the received byte count. The adjustment unit 64 functions as a second adjustment unit.

Furthermore, when data is received by the transmitting/receiving unit 60a, if the second token value before the decrement is less than the corresponding received byte count, the adjustment unit 64 decrements the red value by 1. Accordingly, the adjustment unit 64 also functions as a second counter, and the red value serves as a second counter value.

If the received byte count of data received per unit time exceeds the amount by which the second token value is incremented per unit time, the second token value will be less than the second reference value, and the red value will be incremented. The amount by which the second token value is incremented per unit time is a value obtained by dividing the second reference value by the cycle length. Accordingly, the red value will be incremented if an amount of data received by the transmitting/receiving unit 60a per unit time exceeds a predetermined second threshold. The second reference value is greater than the first reference value, and the length of a cycle in which the first token value is incremented by the first reference value is equal to or is substantially equal to the length of a cycle in which the second token value is incremented by the second reference value. Therefore, the second threshold is greater than the first threshold.

Note that, as described above, each time a predetermined time period elapses, the adjustment unit 64 increments the first token value by the first reference value and increments the second token value by the second reference value, the second reference value being greater than the first reference value. Furthermore, when data is received by the transmitting/receiving unit 60a, the adjustment unit 64 decrements the first token value and the second token value by the same received byte count. Accordingly, the first token value is more likely to become less than the received byte count, and the second token value is less likely to become less than the received byte count. Accordingly, the yellow value is more likely to be incremented, and the red value is less likely to be incremented. If the transmitting/receiving unit 60a is subject to a DoS attack, the yellow value is first incremented, and then the red value is incremented. A DoS attack is detected if the red value is incremented.

In the receiving operation executed when the relay setting of data received by the transmitting/receiving unit 60a is set to "prohibited", the data received by the transmitting/receiving unit 60a is discarded irrespective of the first token value and the second token value, or is output, as save data, to the bus relay 21 by the input/output unit 61.

If the relay setting of data received by the transmitting/receiving unit 60a is set to "prohibited", each time the transmitting/receiving unit 60a receives N pieces of data, the input/output unit 61 outputs one of the N pieces of data received by the transmitting/receiving unit 60a, as save data, to the bus relay 21. Specifically, the input/output unit 61 outputs save data, and then again outputs the N-th data received by the transmitting/receiving unit 60a as save data. As described above, the bus relay 21 saves the save data input from the input/output unit 61. N is an integer of 2 or more, and is constant.

When relaying data received by the transmitting/receiving unit 60a in a receiving operation, if the destination indicated by the destination information contained in the data received by the transmitting/receiving unit 60a is the ECU 3b or 3c, the transmitting/receiving unit 60b or 60c transmits the data received by the transmitting/receiving unit 60a to the destination indicated by the destination information.

In the same case, if the destination indicated by the destination information contained in the data received by the transmitting/receiving unit 60a is one of the ECUs 40, 41, 50, and 51, the input/output unit 62 outputs the data received by the transmitting/receiving unit 60a, as transmission data, to the bus relay 21.

The first token value and the second token value of data received by each of the transmitting/receiving units 60b and 60c are adjusted in the same manner as the first token value and the second token value of data received by the transmitting/receiving unit 60a.

The first token value and the second token value of data received by the transmitting/receiving unit 60b can be explained by replacing the transmitting/receiving unit 60a with the transmitting/receiving unit 60b in the description on the first token value and the second token value of data received by the transmitting/receiving unit 60a. Similarly, the first token value and the second token value of data received by the transmitting/receiving unit 60c can be explained by replacing the transmitting/receiving unit 60a with the transmitting/receiving unit 60c in the description on the first token value and the second token value of data received by the transmitting/receiving unit 60a.

Also, the increment operation and the receiving operation for each of the transmitting/receiving units 60b and 60c are the same as the increment operation and the receiving operation for the transmitting/receiving unit 60a.

The increment operation and the receiving operation for the transmitting/receiving unit 60b can be explained by replacing, in the description on the increment operation and the receiving operation for the transmitting/receiving unit 60a, the transmitting/receiving units 60a, 60b and the ECU 3b with the transmitting/receiving units 60b, 60a and the ECU 3a respectively. Similarly, the increment operation and the receiving operation for the transmitting/receiving unit 60c can be explained by replacing, in the description on the increment operation and the receiving operation for the transmitting/receiving unit 60a, the transmitting/receiving units 60a, 60c and the ECU 3c with the transmitting/receiving units 60c, 60a and the ECU 3a respectively.

The transmitting/receiving units 60a, 60b, 60c respectively correspond to the ECUs 3a, 3b, and 3c. The bus relay 21 outputs data to the input/output unit 61 of the ECU relay 20. Upon input of the data to the input/output unit 61, one of the transmitting/receiving units 60a, 60b, and 60c transmits the data input to the input/output unit 61 to a destination. The transmitting/receiving unit that transmits the data input to the input/output unit 61 is the transmitting/receiving unit that corresponds to the destination indicated by the destination information contained in this data. If, for example, the destination information indicates the ECU 3a as a destination, the transmitting/receiving unit 60a transmits the data input to the input/output unit 61 to the ECU 3a.

As shown in FIG. 2, the bus relay 21 includes a control unit 70, input/output units 71 and 72, a storage unit 73, and communication units 74 and 75. These components are individually connected to an internal bus 76. The input/output units 71 and 72 are connected to, in addition to the internal bus 76, the input/output units 61 and 62 of the ECU relay 20. The communication units 74 and 75 are connected to, in addition to the internal bus 76, the communication buses 42 and 52.

The input/output unit 61 of the ECU relay 20 outputs transmission data and save data to the input/output unit 71 of the bus relay 21. The input/output unit 71 of the bus relay 21 outputs data to the input/output unit 61 of the ECU relay 20, in accordance with an instruction of the control unit 70.

The input/output unit 62 of the ECU relay 20 outputs a counter value signal to the input/output unit 72 of the bus relay 21. As described above, a counter value signal indicates content of the counter value information stored in the storage unit 63 of the ECU relay 20. The input/output unit 71 of the bus relay 21 outputs an instruction signal and a request signal to the input/output unit 61 of the ECU relay 20 in accordance with an instruction of the control unit 70.

The communication unit 74 receives data transmitted by the ECU 40 or 41 via the communication bus 42. Also, the communication unit 74 transmits data to the ECUs 40 and 41 via the communication bus 42 in accordance with an instruction of the control unit 70.

Similarly, the communication unit 75 receives data transmitted by the ECU 50 or 51 via the communication bus 52. Also, the communication unit 75 transmits data to the ECUs 50 and 51 via the communication bus 52 in accordance with an instruction of the control unit 70.

In the storage unit 73, a computer program P1 is stored. The control unit 70 includes a not-shown central processing unit (CPU). By executing the computer program P1, the CPU of the control unit 70 executes first relay processing, second relay processing, saving processing, and monitoring processing.

The first relay processing is processing relating to relay of data input to the input/output unit 71 from the input/output unit 61 of the ECU relay 20. The second relay processing is processing relating to relay of data received by the communication unit 74 or 75. The saving processing is processing for saving save data input from the input/output unit 61 of the ECU relay 20 to the input/output unit 71 of the bus relay 21. The monitoring processing is processing for monitoring the yellow values and the red values indicated by the counter value information stored in the storage unit 63 of the ECU relay 20, that is, processing for monitoring states in which the transmitting/receiving units 60a, 60b, and 60c receive data. The computer program P1 is used for the control unit 70 to execute the first relay processing, the second relay processing, the saving processing, and the monitoring processing.

Note that the computer program P1 may also be stored in a storage medium A1 so as to be readable by the CPU of the control unit 70. In this case, the computer program P1 that is read from the storage medium A1 by a not-shown read-out device is stored in the storage unit 73. The storage medium A1 is an optical disc, a flexible disc, a magnetic disc, a magnetooptical disc, a semiconductor memory, or the like. "Optical disc" refers to a CD (Compact Disc)-ROM (Read Only Memory), a DVD (Digital Versatile Disc)-ROM, a BD (Blu-ray (registered trademark) Disc), or the like. "Magnetic disc" refers to, for example, a hard disc. Alternatively, the computer program P1 may also be downloaded from a not-shown external device connected to a not-shown communication network, and the downloaded computer program P1 may also be stored in the storage unit 73.

The control unit 70 executes the first relay processing each time transmission data is input to the input/output unit 71. In the first relay processing, the control unit 70 determines, based on destination information contained in the transmission data input to the input/output unit 71, one of the communication units 74 and 75 to which the transmission data is to be transmitted. This corresponds to determining one of the communication buses 42 and 52 as the medium via which the transmission data is to be transmitted, based on the destination information.

Then, the control unit 70 converts the format of the transmission data input to the input/output unit 71 from the first protocol format to the second protocol format. Then, the control unit 70 instructs the determined communication unit to transmit the transmission data in the converted format. Accordingly, the communication unit determined by the control unit 70 transmits the transmission data in the converted format via the corresponding one of the communication buses 42 and 52. For example, if the communication unit determined by the control unit 70 is the communication unit 74, the control unit 70 instructs the communication unit 74 to transmit the transmission data, and the communication unit 74 transmits the transmission data via the communication bus 42.

As described above, the transmission data is data received by one of the transmitting/receiving units 60a, 60b, and 60c. Accordingly, the communication units 74 and 75 function as a transmission unit.

Identification information contained in transmission data to be transmitted by a communication unit determined by the control unit 70 is generated based on the destination information contained in transmission data input to the input/output unit 71.

After having given the instruction to transmit the transmission data, the control unit 70 ends the first relay processing.

The control unit 70 executes the second relay processing each time data is received by one of the communication units 74 and 75. The control unit 70 determines whether or not to discard the data received by the one of the communication units 74 and 75, based on the identification information contained in the data received by the one of the communication units 74 and 75. If it is determined that the data is to be discarded, the control unit 70 discards the data received by the one of the communication units 74 and 75, and ends the second relay processing.

If it is determined that the data is not to be discarded, the control unit 70 determines the destination of the data received by the one of the communication units 74 and 75 based on the identification information contained in the data. If the determined destination is the ECU 40 or 41, the control unit 70 instructs the communication unit 74 to transmit the data received by the communication unit 75. In response thereto, the communication unit 74 transmits the data received by the communication unit 75 to the destination determined by the control unit 70 via the communication bus 42. If the determined destination is the ECU 50 or 51, the control unit 70 instructs the communication unit 75 to transmit the data received by the communication unit 74. In response thereto, the communication unit 75 transmits the data received by the communication unit 74 to the destination determined by the control unit 70 via the communication bus 52.

After having instructed the communication unit 74 or the communication unit 75 to transmit the data, the control unit 70 ends the second relay processing.

If the destination determined based on the identification information is one of the ECUs 3a, 3b, and 3c, the control unit 70 converts the format of the data received by the communication unit 74 or 75 from the second protocol format to the first protocol format, and instructs the input/output unit 71 to transmit the data in the converted format. In response thereto, the input/output unit 71 outputs the data in the format converted by the control unit 70 to the input/output unit 61 of the ECU relay 20. The data in the converted format contains destination information that indicates the destination determined by the control unit 70.

As described above, upon input of the data to the input/output unit 61 of the ECU relay 20, the transmitting/receiving unit that corresponds to the destination indicated by the destination information contained in the data transmits the data input to the input/output unit 61 to the destination.

After having instructed the input/output unit 71 to output the data in the converted format, the control unit 70 ends the second relay processing.

The control unit 70 executes the saving processing each time the input/output unit 61 of the ECU relay 20 outputs save data to the input/output unit 71 of the bus relay 21. In the saving processing, the control unit 70 saves the save data input to the input/output unit 71 in the storage unit 73, and ends the saving processing.

Figure 8:
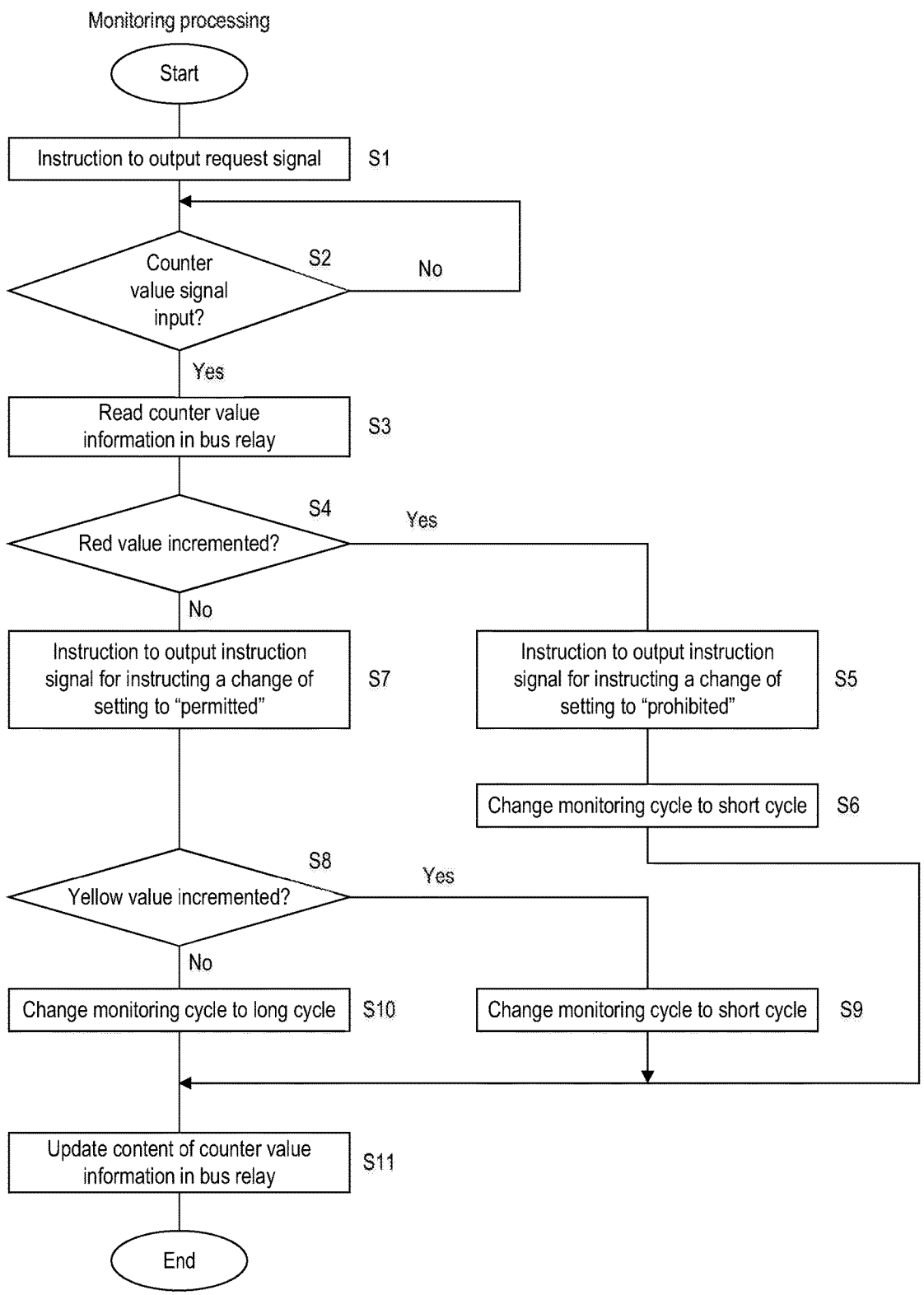
FIG. 8 is a flowchart illustrating a procedure of monitoring processing.

FIG. 8 is a flowchart showing a procedure of the monitoring processing. The control unit 70 of the bus relay 21 executes the monitoring processing each time a monitoring cycle elapses. The monitoring cycle is set to a short cycle or a long cycle. The monitoring cycle is changed by the control unit 70 to the short cycle or the long cycle. The short cycle and the long cycle are preset and are constant. The short cycle is shorter than the long cycle. The short cycle is, for example, 1 second, and the long cycle is, for example, 10 seconds. The long cycle and the short cycle correspond to a first cycle and a second cycle, respectively.

Also, counter value information is stored not only in the storage unit 63 of the ECU relay 20, but also in the storage unit 73 of the bus relay 21.

In the monitoring processing, as described later, the input/output unit 72 is instructed to output a request signal for requesting transmission of a counter value signal, and the input/output unit 72 outputs a request signal to the input/output unit 62 of the ECU relay 20. Then, a counter value signal output by the input/output unit 62 is input to the input/output unit 72.

Each time a counter value signal is input to the input/output unit 72, the green values, the yellow values, and the red values of the counter value information stored in the storage unit 73 with respect to data received by the transmitting/receiving units 60a, 60b, and 60c are updated by the control unit 70 to the green values, the yellow values, and the red values indicated by the counter value signal input to the input/output unit 72. The monitoring processing is executed in a repeated manner. Accordingly, at a point in time when monitoring processing is executed, the green values, the yellow values, and the red values indicated by the counter value information stored in the storage unit 73 of the bus relay 21 with respect to data received by the transmitting/receiving units 60a, 60b, and 60c are the green values, the yellow values, and the red values indicated by a counter value signal input to the input/output unit 72 in the previous monitoring processing.

In the monitoring processing, the control unit 70 first instructs the input/output unit 72 to output a request signal for requesting output of a counter value signal (step S1). In response thereto, the input/output unit 72 outputs a request signal to the input/output unit 62 of the ECU relay 20. Upon input of the request signal, the input/output unit 62 of the ECU relay 20 outputs a counter value signal to the input/output unit 72. As described above, a counter value signal indicates content of the counter value information stored in the storage unit 63, that is, green values, yellow values, and red values with respect to data received by the transmitting/receiving units 60*a*, 60*b*, and 60*c*. The control unit 70 acquires, from the input/output unit 72, the content indicated by the counter value signal, that is, the green values, the yellow values, and the red values indicated by the counter value information stored in the storage unit 63.

After the execution of step S1, the control unit 70 determines whether or not a counter value signal is input to the input/output unit 72 (step S2). If it is determined that a counter value signal is not input to the input/output unit 72 (NO in step S2), the control unit 70 executes step S2 again, and waits until a counter value signal is input to the input/output unit 72.

If it is determined that a counter value signal is input to the input/output unit 72 (YES in step S2), the control unit 70 reads, from the storage unit 73, the counter value information stored in the bus relay 21, with respect to data received by the transmitting/receiving units 60*a*, 60*b*, and 60*c*, that is, the green values, the yellow values, and the red values indicated by the counter value signal input to the input/output unit 72 in the previous monitoring processing (step S3).

Then, the control unit 70 determines, with respect to data received by at least one of the transmitting/receiving units 60*a*, 60*b*, and 60*c*, whether or not the red value indicated by the counter value information stored in the storage unit 63 of the ECU relay 20 has been incremented (step S4). Specifically, in step S4, the control unit 70 determines, with respect to data received by at least one of the transmitting/receiving units 60*a*, 60*b*, and 60*c*, whether or not the red value stored in the ECU relay 20 at a point in time when the current monitoring processing is executed is greater than the red value stored in the ECU relay 20 at a point in time when the previous monitoring processing was executed.

If it is determined that the red value with respect to the data received by at least one of the transmitting/receiving units 60*a*, 60*b*, and 60*c* has been incremented (YES in step S4), the control unit 70 instructs the input/output unit 72 to output an instruction signal for instructing a change of the relay setting of the data with respect to which the red value has been incremented to "prohibited" (step S5). In response thereto, the input/output unit 72 outputs, to the input/output unit 62 of the ECU relay 20, an instruction signal for instructing a change of the relay setting of the data with respect to which the red value has been incremented to "prohibited". Upon input of the instruction signal to the input/output unit 62, in the setting information stored in the storage unit 63, the relay setting of the data with respect to which the red value has been incremented is changed to "prohibited".

For example, if it is determined by the control unit 70 that the red value with respect to data received by the transmitting/receiving unit 60*c* has been incremented, the relay setting of the data received by the transmitting/receiving unit 60*c* is changed to "prohibited".

After the execution of step S5, the control unit 70 changes the monitoring cycle to the short cycle (step S6).

If it is determined that none of the red values with respect to data received by the respective transmitting/receiving units 60*a*, 60*b*, and 60*c* has been incremented (NO in step S4), the control unit 70 instructs the input/output unit 72 to output an instruction signal for instructing a change of the relay settings of data received by the respective transmitting/receiving units 60*a*, 60*b*, and 60*c* to "permitted" (step S7). In response thereto, the input/output unit 72 outputs, to the input/output unit 62 of the ECU relay 20, an instruction signal for instructing a change of the relay settings of data received by the respective transmitting/receiving units 60*a*, 60*b*, and 60*c* to "permitted". Upon input of the instruction signal to the input/output unit 62, in the setting information stored in the storage unit 63, the relay settings of data received by the respective transmitting/receiving units 60*a*, 60*b*, and 60*c* are changed to "permitted".

Then, the control unit 70 determines, with respect to data received by at least one of the transmitting/receiving units 60*a*, 60*b*, and 60*c*, whether or not the yellow value indicated by the counter value information stored in the storage unit 63 of the ECU relay 20 has been incremented (step S8). That is, in step S7, the control unit 70 determines, with respect to data received by at least one of the transmitting/receiving units 60*a*, 60*b*, and 60*c*, whether or not the yellow value stored in the ECU relay 20 at a point in time when the current monitoring processing is executed is greater than the yellow value stored in the ECU relay 20 at a point in time when the previous monitoring processing was executed.

If it is determined that the yellow value with respect to the data received by at least one of the transmitting/receiving units 60*a*, 60*b*, and 60*c* has been incremented (YES in step S8), the control unit 70 changes the monitoring cycle to the short cycle (step S9). If it is determined that none of the yellow values with respect to data received by the respective transmitting/receiving units 60*a*, 60*b*, and 60*c* has been incremented (NO in step S8), the control unit 70 changes the monitoring cycle to the long cycle (step S10).

After having executed one of the steps S6, S9, and S10, the control unit 70 updates the content of the counter value information stored in the bus relay 21 to the content indicated by the counter value signal input to the input/output unit 72 in the current monitoring processing (step S11). Accordingly, the green values, the yellow values, and the red values of the counter value information stored in the storage unit 73 with respect to data received by the transmitting/receiving units 60*a*, 60*b*, and 60*c* are updated to the green values, the yellow values, and the red values indicated by the counter value signal input to the input/output unit 72.

After the execution of step S11, the control unit 70 ends the monitoring processing.

Figure 9:
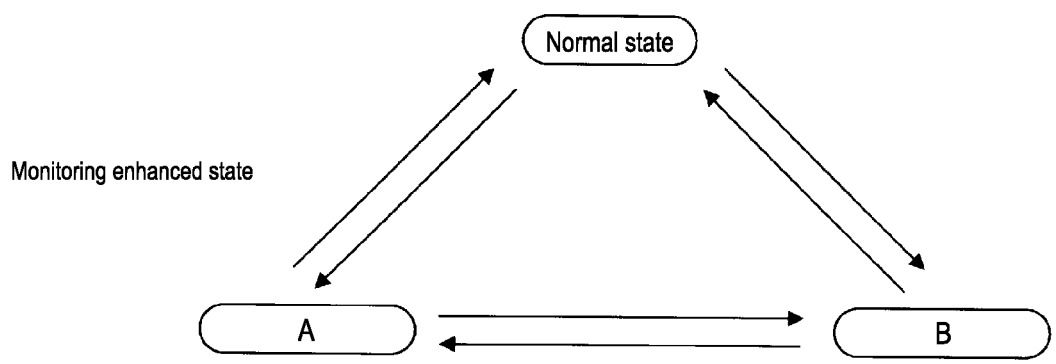
FIG. 9 illustrates state transition of the bus relay.

FIG. 9 illustrates state transition of the bus relay 21. In monitoring processing that is periodically executed, the state of the bus relay 21 transitions to a variety of states. If both the yellow value and the red value with respect to data received by each of the transmitting/receiving units 60*a*, 60*b*, and 60*c* have not been incremented, the bus relay 21 is in a normal state. When the bus relay 21 is in the normal state, the control unit 70 of the bus relay 21 executes monitoring processing with the long cycle, to acquire and monitor the yellow values and the red values indicated by the counter value information stored in the ECU relay 20 with the long cycle.

When the bus relay 21 is in the normal state, it is assumed that it is determined by the control unit 70 of the bus relay 21 that the yellow value with respect to data received by at least one of the transmitting/receiving units 60*a*, 60*b*, and 60*c* has been incremented, and that none of the red values with respect to data received by the transmitting/receiving units 60a, 60b, and 60c has been incremented. At this time, the state of the bus relay 21 transitions from the normal state to a monitoring enhanced state. When the bus relay 21 is in the monitoring enhanced state, the control unit 70 of the bus relay 21 shortens the monitoring cycle from the long cycle to the short cycle, and executes monitoring processing with the short cycle. As a result, the control unit 70 acquires and monitors the yellow values and the red values indicated by the counter value information stored in the ECU relay 20 with the short cycle. The control unit 70 functions as a shortening unit.

When the bus relay 21 is in the monitoring enhanced state, if it is determined by the control unit 70 of the bus relay 21 that the yellow values and the red values with respect to the transmitting/receiving units 60a, 60b, and 60c have not been incremented, the state of the bus relay 21 returns from the monitoring enhanced state to the normal state. Accordingly, the control unit 70 returns the monitoring cycle from the short cycle to the long cycle.

When the bus relay 21 is in the monitoring enhanced state, if it is determined by the control unit 70 of the bus relay 21 that the red value with respect to at least one of the transmitting/receiving units 60a, 60b, and 60c has been incremented, the state of the bus relay 21 transitions from the monitoring enhanced state to a relay prohibited state. When the bus relay 21 is in the relay prohibited state, the relay setting of data with respect to which the red value has been incremented is changed to "prohibited". Accordingly, relay of the data with respect to which the red value has been incremented is prohibited. As a result, the communication units 74 and 75 of the bus relay 21 stop transmitting, from among data received by the transmitting/receiving units 60a, 60b, and 60c, the data with respect to which the red value has been incremented. For example, if the red value with respect to the data received by the transmitting/receiving unit 60a has been incremented, the relay setting of the data received by the transmitting/receiving unit 60a is changed to "prohibited", and the communication units 74 and 75 stop transmitting the data received by the transmitting/receiving unit 60a. Accordingly, the number of times that data relating to a DoS attack is transmitted by the communication units 74 and 75 is suppressed.

As described above, each time N pieces of data whose relay setting is set to "prohibited", from among data received by the transmitting/receiving units 60a, 60b, and 60c, are received, one of the received N pieces of data is output, as save data, from the input/output unit 61 of the ECU relay 20 to the input/output unit 71 of the bus relay 21. The control unit 70 of the bus relay 21 saves the save data input to the input/output unit 71 in the storage unit 73.

For example, if the relay setting of data received by the transmitting/receiving unit 60a is "prohibited", each time N pieces of data are received by the transmitting/receiving unit 60a, one of the N pieces of data received by the transmitting/receiving unit 60a is output, as save data, from the input/output unit 61 of the ECU relay 20 to the input/output unit 71 of the bus relay 21. The control unit 70 of the bus relay 21 saves the save data input to the input/output unit 71 in the storage unit 73. The data saved in the storage unit 73 is used to analyze a DoS attack, for example. The data saved in the storage unit 73 is wirelessly transmitted to a server placed outside the vehicle by a not-shown wireless device, for example. The control unit 70 also functions as a saving unit.

Also, when the bus relay 21 is in the relay prohibited state, the control unit 70 executes monitoring processing with the short cycle. Accordingly, even after having determined that the red value with respect to at least one of the transmitting/receiving units 60a, 60b, and 60c was incremented, the control unit 70 acquires and monitors the yellow values and the red values indicated by the counter value information stored in the ECU relay 20 with the monitoring cycle, and determines, with the monitoring cycle, whether or not the red value has been incremented. Here, the control unit 70 adjusts the monitoring cycle to the short cycle.

When the bus relay 21 is in the relay prohibited state, it is assumed that it is determined by the control unit 70 of the bus relay 21 that the yellow value with respect to data received by at least one of the transmitting/receiving units 60a, 60b, and 60c has been incremented, and that none of the red values with respect to data received by the respective transmitting/receiving units 60a, 60b, and 60c has been incremented. At this time, the state of the bus relay 21 returns from the relay prohibited state to the monitoring enhanced state. As a result, the communication units 74 and 75 of the bus relay 21 restart the stopped transmission of the data received by the corresponding one of the transmitting/receiving units 60a, 60b, and 60c.

Also, when the bus relay 21 is in the relay prohibited state, if it is determined by the control unit 70 of the bus relay 21 that the yellow values and the red values with respect to data received by the transmitting/receiving units 60a, 60b, and 60c have not been incremented, the state of the bus relay 21 returns from the relay prohibited state to the normal state. As a result, the communication units 74 and 75 of the bus relay 21 restart the stopped transmission of the data received by the corresponding one of the transmitting/receiving units 60a, 60b, and 60c.

When the bus relay 21 is in the normal state, if it is determined by the control unit 70 of the bus relay 21 that the red value with respect to data received by at least one of the transmitting/receiving units 60a, 60b, and 60c has been incremented, the state of the bus relay 21 transitions from the normal state to the monitoring enhanced state.

As described above, the control unit 70 of the bus relay 21 executes the monitoring processing of monitoring, with the short cycle or the long cycle, the states in which the transmitting/receiving units 60a, 60b, and 60c of the ECU relay 20 receive data. Accordingly, the bus relay 21 functions as a monitor, and the relay device 2 functions as a receiving device.

Also, in the monitoring processing periodically executed, the control unit 70 instructs the input/output unit 72 to output a request signal and thereby acquires and monitors the green values, the yellow values, and the red values indicated by the counter value information of the ECU relay 20, with respect to data received by the transmitting/receiving units 60a, 60b, and 60c. Furthermore, the control unit 70 also determines whether or not any of the yellow values and the red values has been incremented. Accordingly, the control unit 70 also functions as a first determination unit and a second determination unit.

In the relay device 2 having the above-described configuration, if it is determined by the control unit 70 of the bus relay 21 that the red value with respect to at least one of the transmitting/receiving units 60a, 60b, and 60c has been incremented, a DoS attack is detected. When the bus relay 21 is in the normal state, there is considered to be a low likelihood that a DoS attack is occurring, and thus the monitoring cycle is adjusted to the long cycle, so that the control unit 70 has a low processing load to monitor a DoS attack. When the bus relay 21 is in the monitoring enhanced state, there is considered to be a high likelihood that a DoS attack is occurring, and thus the monitoring cycle is adjusted to the short cycle, so that the DoS attack is promptly detected.

The monitoring cycle is a cycle in which monitoring processing is executed, and thus corresponds to a cycle in which green values, yellow values, and red values indicated by counter value information stored in the storage unit 63 of the ECU relay 20 are acquired.

Also, when the state of the bus relay 21 has transitioned from the monitoring enhanced state to the normal state, there is considered to be a low likelihood that a DoS attack is occurring, and thus the monitoring cycle is changed from the short cycle to the long cycle, so that the processing load of the control unit 70 to monitor a DoS attack is further reduced.

Furthermore, while the state of the bus relay 21 is in the relay prohibited state, if the DoS attack is stopped, that is, if it is determined by the control unit 70 that none of the red values with respect to data received by the respective transmitting/receiving units 60a, 60b, and 60c has been incremented, the relay setting set to "prohibited" is changed to "permitted". Since the monitoring cycle when the state of the bus relay 21 is in the relay prohibited state is the short cycle, it is possible to promptly change the relay setting from "prohibited" to "permitted" so that processing of the data whose relay setting was set to "prohibited" can be promptly restarted.

Embodiment 2

Figure 10:
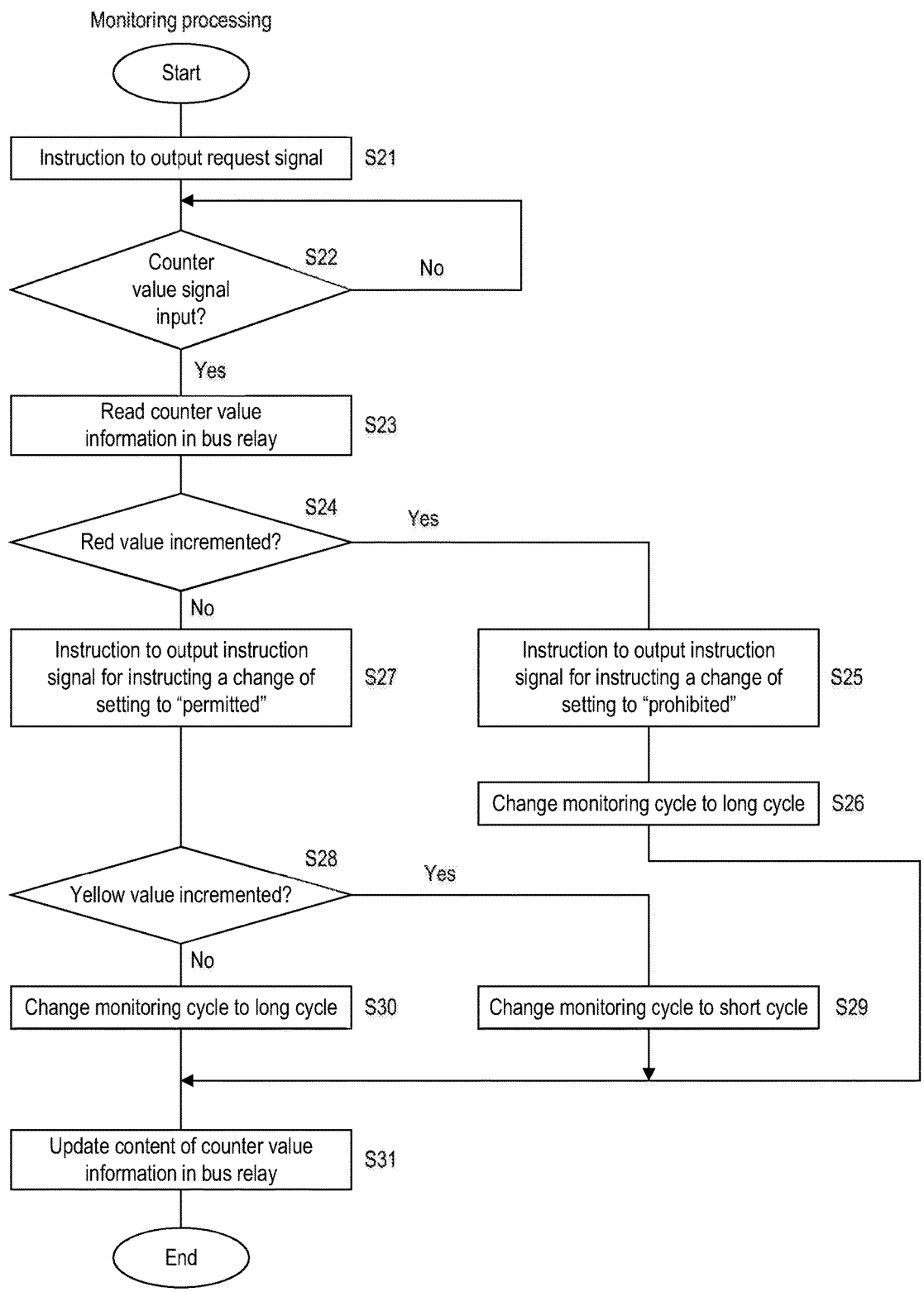
FIG. 10 is a flowchart illustrating a procedure of monitoring processing according to Embodiment 2.

FIG. 10 is a flowchart showing a procedure of monitoring processing according to Embodiment 2.

The following will describe differences of Embodiment 2 from Embodiment 1. Other structures except for the below-described structure are the same as those of Embodiment 1, and thus the same reference numerals as those of Embodiment 1 are given to the constituent components common to Embodiment 1, and descriptions thereof are omitted.

The communication system 1 according to Embodiment 2 differs from the communication system 1 according to Embodiment 1 in the procedure of the monitoring processing. The control unit 70 of the bus relay 21 executes monitoring processing according to Embodiment 2 with a monitoring cycle. Steps S21 to S25, and steps S27 to S31 of the monitoring processing according to Embodiment 2 are the same as those of steps S1 to S5, and steps S7 to S11 of the monitoring processing according to Embodiment 1. Thus, detailed descriptions of steps S21 to S25 and steps S27 to S31 are omitted.

After having executed step S25, the control unit 70 changes the monitoring cycle to the long cycle (step S26). After having executed one of steps S26, S29, and S30, the control unit 70 executes step S31.

Similar to Embodiment 1, in Embodiment 2, the control unit 70 executes the monitoring processing with the monitoring cycle also when the bus relay 21 is in the relay prohibited state. Accordingly, even after having determined that the red value with respect to at least one of the transmitting/receiving units 60a, 60b, and 60c was incremented, the control unit 70 acquires and monitors, with the monitoring cycle, yellow values and red values indicated by counter value information stored in the ECU relay 20, and determines whether or not any of the red values has been incremented with the monitoring cycle. In Embodiment 2, when the bus relay 21 is in the relay prohibited state, the control unit 70 adjusts the monitoring cycle to the long cycle, instead of the short cycle. Thus, after detection of a DoS attack, the processing load to monitor a DoS attack is low.

The relay device 2 according to Embodiment 2 achieves the same effects as those achieved by the relay device 2 according to Embodiment 1, except for effects achieved by adjusting the monitoring cycle to the short cycle when the bus relay 21 is in the relay prohibited state.

Note that, when the bus relay 21 according to Embodiments 1 and 2 is in the relay prohibited state, if the number of transmitting/receiving units that have received data with respect to which the red value has been incremented is reduced, the relay setting of the data with respect to which the red value has no longer been incremented may be changed to "permitted". For example, in monitoring processing executed after determination that the red value with respect to data received by any of the transmitting/receiving units 60a and 60b has been incremented, if it is determined that only the red value with respect to the data received by the transmitting/receiving unit 60b has been incremented, then the control unit 70 may change the relay setting of the data received by the transmitting/receiving unit 60a from "prohibited" to "permitted".

Furthermore, the number of cycles set as the monitoring cycles is not limited to 2. In the monitoring processing, if it is determined that the yellow value with respect to data received by any of the transmitting/receiving units 60a, 60b, and 60c has been incremented, the control unit 70 may adjust the monitoring cycle to, for example, a cycle shorter than the current cycle. Furthermore, if it is determined that none of the yellow values with respect to data received by the respective transmitting/receiving units 60a, 60b, and 60c has been incremented, then the control unit 70 may adjust the monitoring cycle to, for example, a cycle longer than the current cycle.

Furthermore, the control unit 70 of the bus relay 21 may also execute individually monitoring processing with respect to data received by each of the transmitting/receiving units 60a, 60b, and 60c. In this case, the control unit 70 executes three pieces of monitoring processing. In each piece of monitoring processing, the control unit 70 determines whether or not the red value and the yellow value have been incremented with respect to the data received by the transmitting/receiving unit corresponding to that piece of monitoring processing.

Also, the control unit 70 instructs the input/output unit 72 to output an instruction signal for instructing a change of the relay setting of data received by the transmitting/receiving unit corresponding to that piece of monitoring processing to "permitted" or "prohibited". Furthermore, the control unit 70 changes, in the three pieces of monitoring processing, the monitoring cycle individually to the short cycle or the long cycle. The control unit 70 updates, with respect to content of the counter value information stored in the bus relay, only the green value, the yellow value, and the red value with respect to data received by the transmitting/receiving unit that corresponds to the monitoring cycle. The state of the bus relay 21 also depends on data received by the corresponding one of the transmitting/receiving units 60a, 60b, and 60c.

Furthermore, the number of transmitting/receiving units included in the ECU relay 20 is not limited to three, and may also be one, two, or four or more.

Furthermore, the number of communication buses connected to the bus relay 21 is not limited to two, and may also be one, or three or more. Furthermore, the number of ECUs connected to one communication bus is not limited to two, and may also be one, or three or more. Furthermore, the number of ECUs connected to one communication bus may also be different from that of ECUs connected to at least one of other communication buses.

Moreover, with respect to adjustment of a first token value in a receiving operation, if the first token value is less than a received byte count, the adjustment unit 64 may also adjust the first token value to, for example, the lower limit (=0). Similarly, with respect to a second token value in a receiving operation, if the second token value is less than a received byte count, the adjustment unit 64 may also adjust the second token value to, for example, the lower limit (=0). Furthermore, a value by which the first token value and the second token value are decremented is not limited to a received byte count, and may also be a data value that corresponds to an amount of data received by a transmitting/receiving unit. The data value may also be a value obtained by dividing the bit value of data received by a transmitting/receiving unit by 1000.

Disclosed Embodiments 1 and 2 are illustrative in all respects, and are not to be construed as limiting. The scope of the present disclosure is defined by the claims rather than the above-described meaning, and the meaning equivalent to the claims and all modifications within the claims are intended to be included.

The invention claimed is:

1. A relay device comprising:
a processor for executing a computer program stored on a non-transitory memory;
a receiver with a receiving unit configured to receive data; and a monitor configured to monitor a state in which the receiving unit receives data,
the computer program causing the receiver to execute the following steps:
actuate a first adjustment unit, the first adjustment unit being a software program configured to periodically increment a first variable value by a first predetermined value, and decrement, each time data is received by the receiving unit, the first variable value by a data value that corresponds to an amount of the data received by the receiving unit;
actuate a first counter, the first counter being a software program configured to increment, upon data being received by the receiving unit, a first counter value if the first variable value before being decremented by the first adjustment unit is less than the data value;
actuate a second adjustment unit, the second adjustment unit being a software program configured to periodically increment a second variable value by a second predetermined value, which is greater than the first predetermined value, and decrement, each time data is received by the receiving unit, the second variable value by the data value; and
actuate a second counter, the second counter being a software program configured to increment, upon data being received by the receiving unit, a second counter value if the second variable value before being decremented by the second adjustment unit is less than the data value, and
the computer program causing the monitor to execute the following steps:
actuate a first determination unit, the first determination unit being a software program configured to repeatedly monitor the first counter value, and determine whether or not the first counter value has been incremented;
actuate a second determination unit, the second determination unit being a software program configured to periodically monitor the second counter value, and determine whether or not the second counter value has been incremented; and
actuate a shortening unit, the shortening unit being a software program configured to shorten a monitoring cycle with which the second determination unit monitors the second counter value, if it is determined by the first determination unit that the first counter value has been incremented; and
wherein the monitor determines that an attack in which unwanted data is continuously transmitted at short time intervals occurs if it is determined that the second counter value has been incremented.

2. The relay device according to claim 1,
wherein the shortening unit of the monitor is configured to shorten the monitoring cycle from a predetermined first cycle to a predetermined second cycle, which is shorter than the first cycle, if it is determined by the first determination unit that the first counter value has been incremented, and
if, while the monitoring cycle is set to the second cycle, it is determined by the first determination unit that the first counter value has not been incremented, the shortening unit is configured to return the monitoring cycle to the first cycle.

3. The relay device according to claim 1,
wherein the second determination unit of the monitor is configured to determine, with the monitoring cycle, whether or not the second counter value has been incremented, even after having determined that the second counter value was incremented,
the shortening unit of the monitor is configured to shorten the monitoring cycle from a predetermined first cycle to a predetermined second cycle, which is shorter than the first cycle, if it is determined by the first determination unit that the first counter value has been incremented, and
the shortening unit is configured to adjust the monitoring cycle to the second cycle after it is determined by the second determination unit that the second counter value has been incremented.

4. The relay device according to claim 1,
wherein the second determination unit of the monitor is configured to determine, with the monitoring cycle, whether or not the second counter value has been incremented, even after having determined that the second counter value was incremented,
the shortening unit of the monitor is configured to shorten the monitoring cycle from a predetermined first cycle to a predetermined second cycle, which is shorter than the first cycle, if it is determined by the first determination unit that the first counter value has been incremented, and
the shortening unit is configured to adjust the monitoring cycle to the first cycle after it is determined by the second determination unit that the second counter value has been incremented.

5. The relay device according to claim 1,
wherein the monitor includes a transmission unit configured to transmit data received by the receiving unit of the receiver, and
the transmission unit is configured to stop transmitting the data received by the receiving unit, if it is determined by the second determination unit that the second counter value has been incremented.

6. The relay device according to claim 5,
wherein the transmission unit is configured to restart the transmission, if, while the transmission is stopped, it is determined by the second determination unit that the second counter value has not been incremented.

7. The relay device according to claim 1,
wherein the monitor includes a saving unit configured to save, each time N (where N is an integer of 2 or more) pieces of data received by the receiving unit are received after it is determined by the second determination unit that the second counter value has been incremented, one of the N pieces of data received by the receiving unit.

8. A monitor configured to periodically monitor a state in which data is received, the monitor including a processor for executing a computer program stored on a non-transitory memory, which when executed performs operations comprising:

actuating a first determination unit, the first determination unit being a software program configured to repeatedly monitor a first counter value, which is incremented if an amount of data received per unit time exceeds a first threshold, and determine whether or not the first counter value has been incremented;

actuating a second determination unit, the second determination unit being a software program configured to periodically monitor a second counter value, which is incremented if an amount of data received per unit time exceeds a second threshold, and determine whether or not the second counter value has been incremented, the second threshold being greater than the first threshold; and actuating a shortening unit, the shortening unit being a software program configured to shorten a monitoring cycle with which the second determination unit monitors the second counter value, if it is determined by the first determination unit that the first counter value has been incremented; and wherein the monitor determines that an attack in which unwanted data is continuously transmitted at short time intervals occurs if it is determined that the second counter value has been incremented.

9. A computer program product comprising a non-transitory, machine-readable medium storing instructions which, when executed by at least one programmable processor, caused at least one programmable processor to perform operations comprising:

repeatedly acquiring a first counter value, which is incremented if an amount of data received per unit time exceeds a first threshold;

determining whether or not the first counter value has been incremented;

periodically acquiring a second counter value, which is incremented if an amount of data received per unit time exceeds a second threshold, the second threshold being greater than the first threshold; and shortening a cycle with which the second counter value is acquired, if it is determined that the first counter value has been incremented; and wherein an attack in which unwanted data is continuously transmitted at short time intervals occurs if it is determined that the second counter value has been incremented.

* * * * *